United States Patent
Kumon

(10) Patent No.: US 8,009,869 B2
(45) Date of Patent: Aug. 30, 2011

(54) VEHICLE SURROUNDING MONITORING SYSTEM AND VEHICLE SURROUNDING MONITORING METHOD

(75) Inventor: Hitoshi Kumon, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1033 days.

(21) Appl. No.: 11/783,630

(22) Filed: Apr. 11, 2007

(65) Prior Publication Data

US 2008/0129539 A1 Jun. 5, 2008

(30) Foreign Application Priority Data

Apr. 12, 2006 (JP) .................................. 2006-110262

(51) Int. Cl.
*G06K 9/00* (2006.01)
*G08G 1/00* (2006.01)

(52) U.S. Cl. ....................................... 382/104; 340/901

(58) Field of Classification Search .................. 382/100, 382/104, 173, 190, 196, 206, 270, 286, 195; 340/425.5–490, 500, 907, 588, 630, 578, 340/945, 601–602, 628, 901, 932.2, 933; 348/113–122, 165, 143, 154, 65, 628–630, 348/370, E5.022, 162; 345/473–475; 356/436, 356/437, 438; 250/564
See application file for complete search history.

(56) References Cited

U.S. PATENT DOCUMENTS

| | | | | |
|---|---|---|---|---|
| 7,280,696 B2 * | 10/2007 | Zakrzewski et al. | .......... | 382/218 |
| 7,505,604 B2 * | 3/2009 | Zakrzewski et al. | .......... | 382/100 |
| 7,729,510 B2 * | 6/2010 | Zakrzewski et al. | .......... | 382/100 |
| 2002/0141629 A1 * | 10/2002 | Schreck | ....................... | 382/131 |
| 2009/0040367 A1 * | 2/2009 | Zakrzewski et al. | .......... | 348/370 |

FOREIGN PATENT DOCUMENTS

| | | |
|---|---|---|
| DE | 102 92 327 | 9/2004 |
| DE | 103 46 482 | 5/2005 |
| DE | 10 2004 026 847 | 12/2005 |
| JP | 2003-191810 | 7/2003 |
| JP | 2004-235965 | 8/2004 |
| JP | 2004-260694 | 9/2004 |

OTHER PUBLICATIONS

English translation of Patent Abstract of Japan, Vehicle Surrounding Image Processing System Ueki, T; Imanishi, K; Yanagawa, H; Kato, K; Publication No. 2004260694, Sep. 16, 2004.*
Chinese Office Action dated Jun. 5, 2009.
Japanese Office Action dated Apr. 22, 2008.
German Office Action dated Oct. 27, 2008.

* cited by examiner

*Primary Examiner* — Samir A Ahmed
*Assistant Examiner* — Mehdi Rashidian
(74) *Attorney, Agent, or Firm* — Finnegan, Henderson, Farabow, Garrett & Dunner, LLP

(57) ABSTRACT

A vehicle surrounding monitoring system includes an image-capturing portion, a storage portion, a display-image generation portion, and a display portion. The image-capturing portion captures the image of at least a portion of the area surrounding the vehicle. The storage portion stores the image captured by the image-capturing portion. The display-image generation portion generates a synthesized image for display using a latest image that is captured by the image-capturing portion, and a previous image that is captured before the latest image is captured. The synthesized image is displayed on the display portion. The display-image generation portion decreases the level of visibility of an image region relating to the previous image, according to an elapsed time after the previous image is captured.

17 Claims, 10 Drawing Sheets

VEHICLE SURROUNDING MONITORING SYSTEM AND VEHICLE SURROUNDING MONITORING METHOD

INCORPORATION BY REFERENCE

The disclosure of Japanese Patent Application No. 2006-110262 filed on Apr. 12, 2006, including the specification, drawings and abstract is incorporated herein by reference in its entirety.

BACKGROUND OF THE INVENTION

1. Field of the Invention

The invention relates to a vehicle surrounding monitoring system and a vehicle surrounding monitoring method, in which the image of an area surrounding a vehicle is displayed.

2. Description of the Related Art

Japanese Patent Application Publication No. 2003-191810 (JP-A-2003-191810) describes a vehicle surrounding monitoring system that includes image-capturing means, bird's eye-image transformation means, and display means. The image-capturing means is provided in the rear portion of a vehicle. The bird's eye-image transformation means transforms the image of an area behind the vehicle that is captured by the image-capturing means into a bird's eye image. The bird's eye image, into which the image is transformed by the bird's eye-image transformation means, is displayed on the display means. The vehicle surrounding monitoring system further includes synthesized bird's eye-image generation means, and display control means. The synthesized bird's eye-image generation means generates a synthesized bird's eye image by combining a previous bird's eye image with a current bird's eye image. The display control means displays the synthesized bird's eye image generated by the synthesized bird's eye-image generation means, along with a vehicle figure on the display means to show the relation between the position of the vehicle and the area indicated by the synthesized bird's eye image.

In the above-described system, the synthesized image for display is generated using the previous image that is previously captured. With this configuration, because the previous image is used, the situation out of the field of view of the image-capturing means can also be displayed using the previous image. Accordingly, much information can be provided to a user, as compared to the configuration in which only the current image is displayed.

However, because the situation may change during the period from the time point when the previous image is captured until the current time point, the reliability of the information provided by the previous image is lower than the reliability of the information provided by the current image. Therefore, in the above-described technology, the previous image is covered with a gray filter to make it possible to distinguish the current image from the previous image. However, the user cannot determine the degree of decrease in the reliability of the previous image. That is, in the configuration in which the previous images are displayed in a uniform manner, the user cannot determine the difference in the reliability among the previous images.

SUMMARY OF THE INVENTION

A first aspect of the invention relates to a vehicle surrounding monitoring system that includes an image-capturing portion, a storage portion, a display-image generation portion, and a display portion. The image-capturing portion captures the image of at least a portion of an area surrounding a vehicle. The storage portion stores the image captured by the image-capturing portion. The display-image generation portion generates a synthesized image for display using a latest image that is captured by the image-capturing portion, and a previous image that is captured before the latest image is captured. The synthesized image is displayed on the display portion. The display-image generation portion decreases the level of visibility of an image region relating to the previous image, according to an elapsed time after the previous image is captured.

A second aspect of the invention relates to a vehicle surrounding monitoring method includes capturing the image of at least a portion of an area surrounding a vehicle; storing the image that is captured; generating a synthesized image for display using a latest image that is captured, and a previous image that is captured before the latest image is captured; displaying the synthesized display image; and decreasing the level of visibility of an image region relating to the previous image, according to an elapsed time after the previous image is captured.

According to the invention, it is possible to provide the vehicle surrounding monitoring system and the vehicle surrounding monitoring method that enable a user to easily determine the reliability of the previous image.

BRIEF DESCRIPTION OF THE DRAWINGS

The foregoing and/or further objects, features and advantages of the invention will become more apparent form the following description of example embodiments with reference to the accompanying drawings, in which like numerals are used to represent like elements and wherein.

DETAILED DESCRIPTION OF THE EXAMPLE EMBODIMENTS

Hereinafter, example embodiments of the invention will be described with reference to the drawings.

i. First Embodiment

Figure 1:
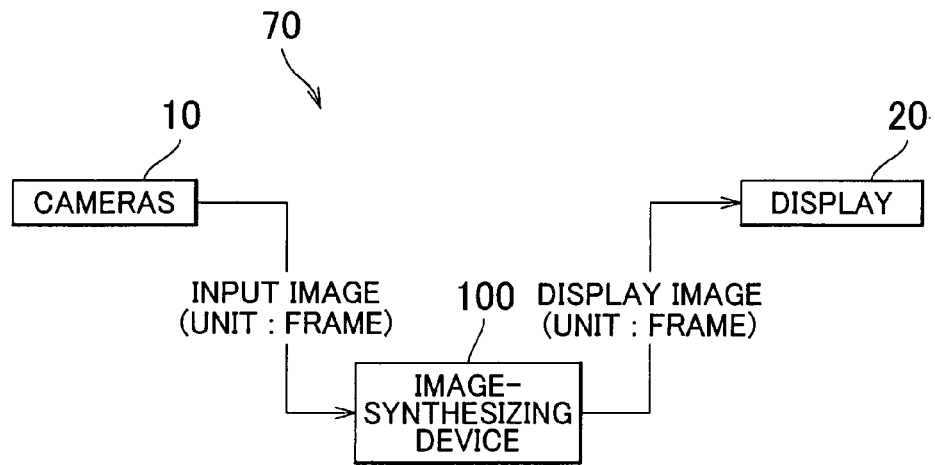
FIG. 1 is a system configuration diagram showing a vehicle surrounding monitoring system according to a first embodiment of the invention.

FIG. 1 is a system configuration diagram showing a vehicle surrounding monitoring system according to a first embodiment of the invention. A vehicle surrounding monitoring system 70 according to the first embodiment includes an image-synthesizing device 100. The image-synthesizing device 100 displays an image (screen image) of an area surrounding a vehicle using a display 20 provided in the vehicle, based on images captured by cameras 10 provided in the vehicle. For example, the display 20 may be a liquid-crystal display. The display 20 is disposed at a position such that an occupant can easily see the display 20. For example, the display 20 may be disposed in an instrument panel. The camera 10 is regarded as "the image-capturing portion", and the display 20 is regarded as "the display portion" according to the invention.

Figure 2:
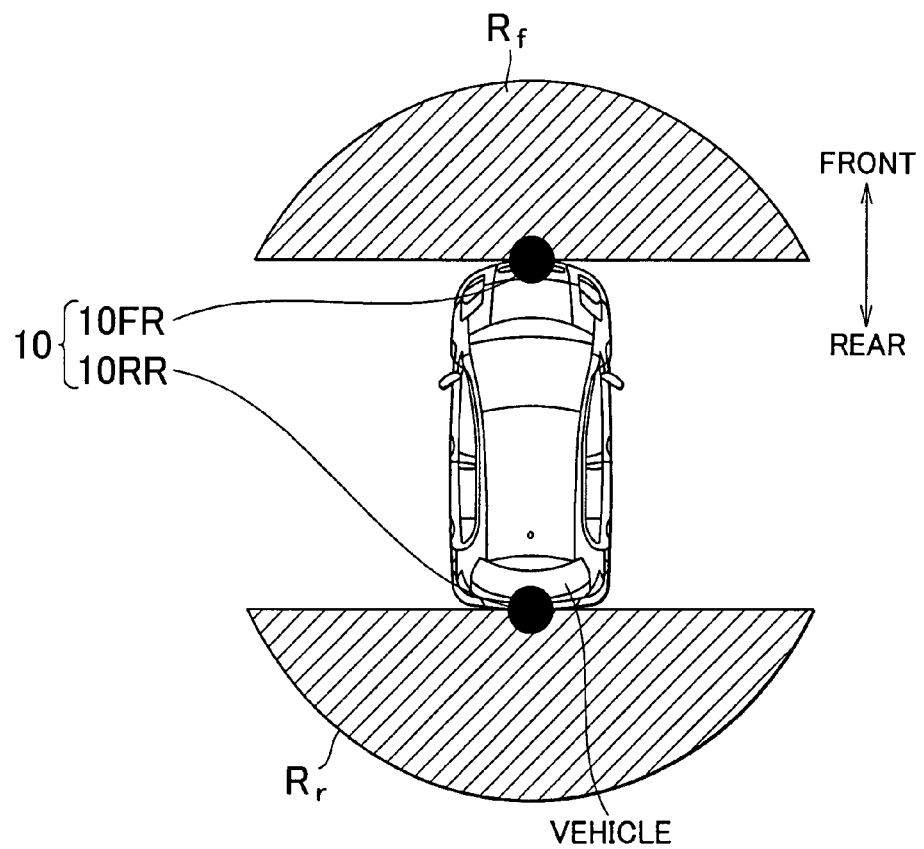
FIG. 2 is a plan view schematically showing an example of a manner in which cameras are provided, and an example of areas whose images are captured by the cameras according to the first embodiment.

FIG. 2 is a plan view showing an example of a manner in which the cameras 10 are provided, and an example of areas whose images are captured by the cameras 10. As shown in FIG. 2, one of the cameras 10 is provided in the front portion, and the other camera 10 is provided in the rear portion of the vehicle. That is, the cameras 10 are provided at two locations in total. Each of the cameras 10 (10FR and 10RR) captures the image of the surrounding area that includes a road surface, using an imaging element such as a CCD (charge-coupled device) and a CMOS (complementary metal oxide semiconductor). Each camera 10 may be a wide-angle camera that includes a fisheye lens.

As schematically shown in FIG. 2, the front camera 10FR is provided in the front portion of the vehicle (for example, near a bumper) to capture the image of the surrounding area that includes the surface of a road ahead of the vehicle. As schematically shown in FIG. 2, the rear camera 10RR is provided in the rear portion of the vehicle (for example, near a rear bumper or in a backdoor) to capture the image of the surrounding area that includes the surface of a road behind the vehicle.

FIG. 2 schematically shows an example of the areas whose images are captured by the cameras 10. In the example shown in FIG. 2, each camera 10 is a wide-angle camera. The area whose image is captured by each camera 10 is shown in a sector shape. In FIG. 2, an imaged area Fro whose image is captured by the front camera 10FR, and an imaged area Err whose image is captured by the rear camera 10RR are emphasized by hatching.

Figure 3:
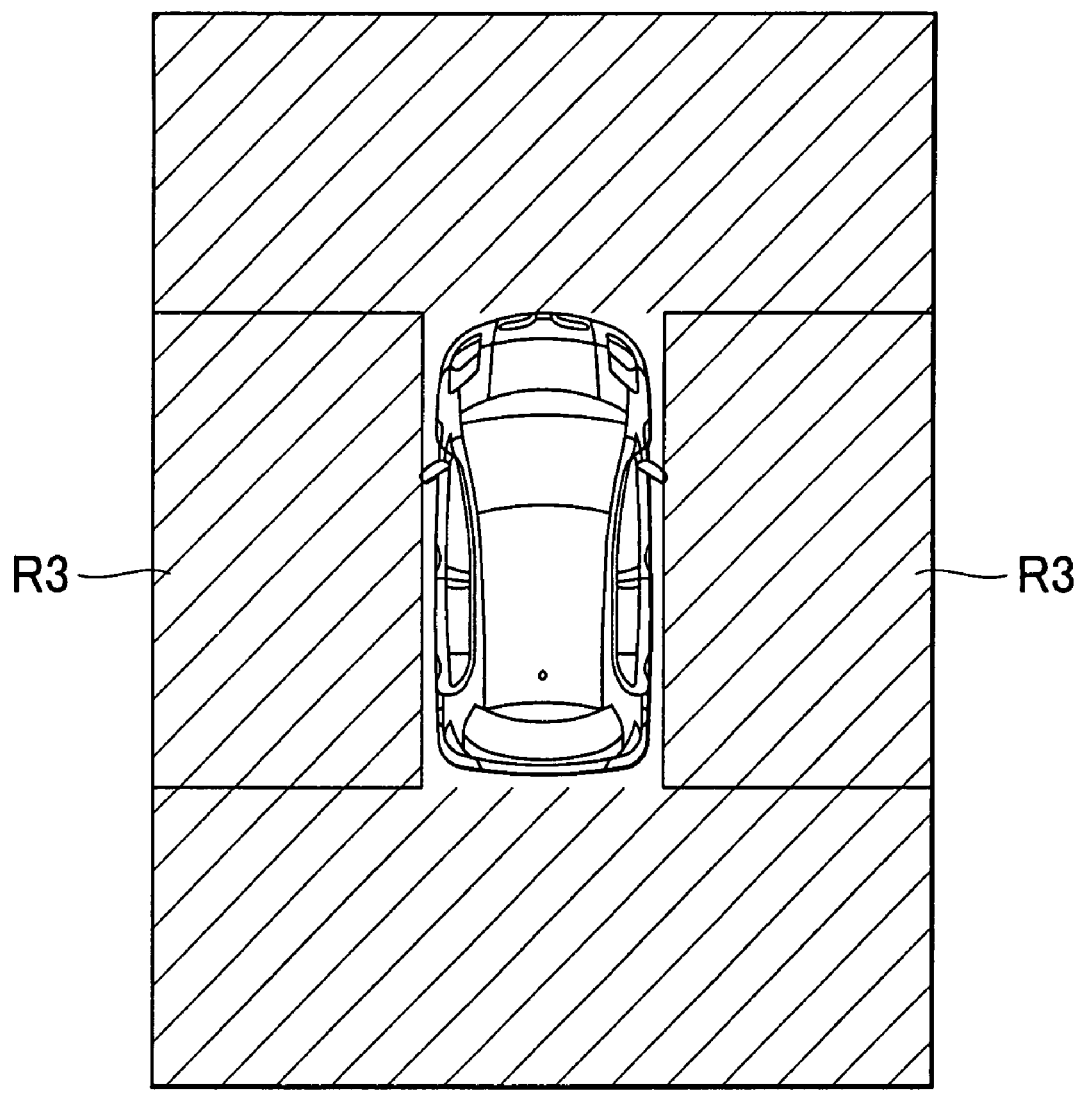
FIG. 3 is a diagram schematically showing an example of a display image that is displayed on a display according to the first embodiment.

FIG. 3 schematically shows an example of a display image displayed on the display 20. The display image is synthesized by combining the images captured by the two cameras 10FR and 10RR. In the example shown in FIG. 3, an image representing the vehicle (vehicle image) is depicted in a center image region of the display image. The vehicle image, which is made in advance, and stored in a predetermined memory (a vehicle-image storage portion 115 described later), may be used. The display image is obtained by disposing the vehicle image in the center image region, and disposing the images captured by the cameras 10 in other image regions. The images captured by the cameras 10 are subjected to appropriate preprocessing (for example, coordinate transformation, distortion correction, and perspective correction) so that the captured images are transformed into the overhead images of a road surface, which are the images viewed from the above (i.e., the bird's eye images). Then, the overhead images are displayed on the display 20. In FIG. 3, each hatched portion shows the road surface or an object on the road surface viewed from the above. An image region R3 on the sides of the vehicle in FIG. 3 is generated by appropriately disposing a previous image that is previously captured by the camera 10FR or 10RR. For example, when the vehicle moves forward, the image region R3 is covered by the previous image that is previously captured by the front camera FR. When the vehicle backs up, the image region R3 is covered by the previous image that is previously captured by the rear camera RR. The manner in which the previous image is displayed will be described in detail later. Thus, it is possible to generate the image of the areas in all directions around the vehicle, without providing a camera on the side portion of the vehicle. Accordingly, the occupant can determine the condition of the road surface and the condition of objects on the road (for example, compartment lines on the road, and the positions of obstacles) in all directions around the vehicle.

Figure 4:
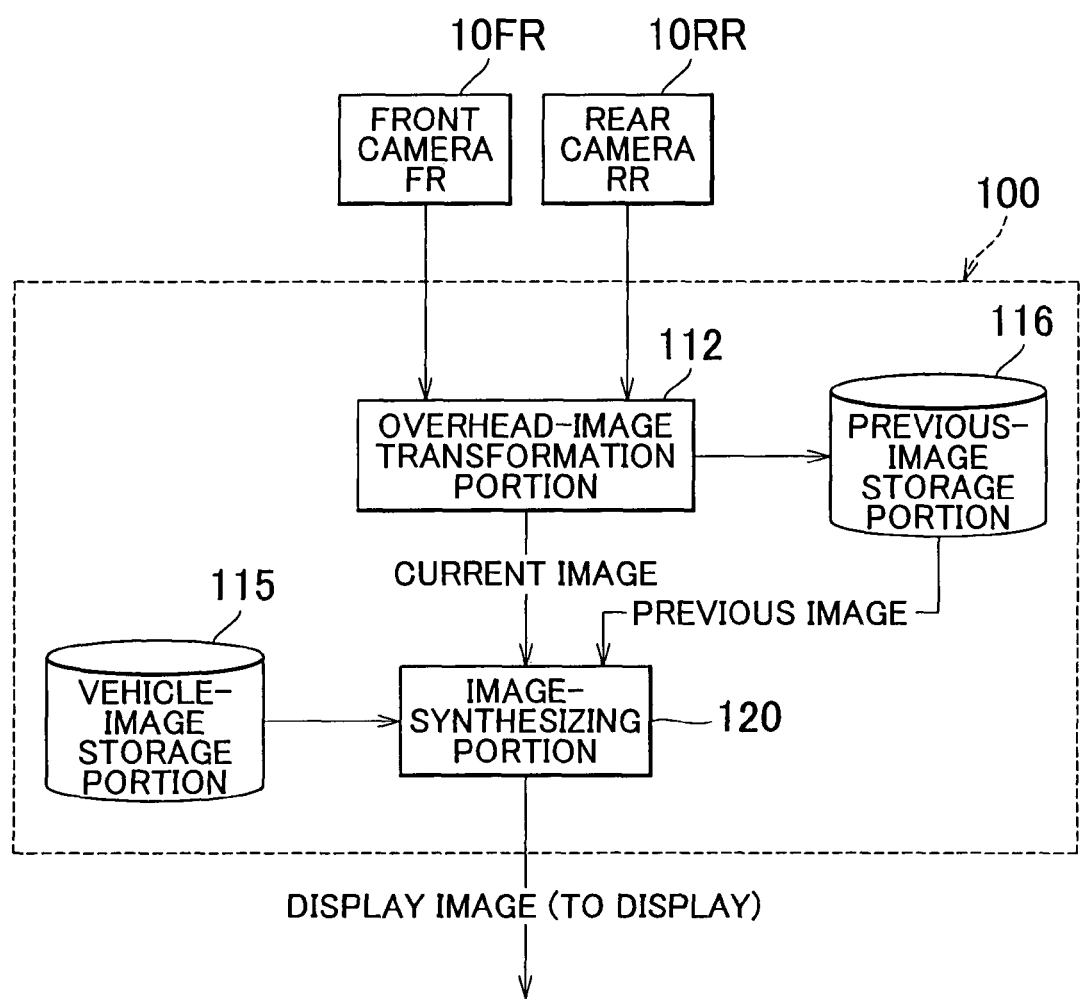
FIG. 4 is a function block diagram showing the main functions of an image-synthesizing device according to the first embodiment.

FIG. 4 is a function block diagram showing the main functions of the image-synthesizing device 100 according to the embodiment. The hardware configuration of the image-synthesizing device 100 mainly includes a microcomputer. That is, the image-synthesizing device 100 includes a CPU, memories (for example, ROM, RAM and EEPROM), a timer, a counter, an input/output interface, and the like. The CPU executes processes according to predetermined execution programs. The memories store the execution programs executed by the CPU, image data, the results of calculations, and the like. The CPU, the memories, and the input/output interface are connected to each other by a data bus. Portions of the image-synthesizing device 100, which will be hereinafter described, are realized by the memories that can be accessed by the CPU, and the programs that are executed by the CPU.

The image-synthesizing device 100 according to the embodiment includes an overhead-image transformation portion 112, the vehicle-image storage portion 115, a previous-image storage portion 116, and an image-synthesizing portion 120. The previous-image storage portion 116 is regarded as "the storage portion", and the image-synthesizing portion 120 is regarded as "the display-image generation portion" according to the invention.

The image-synthesizing device 100 receives necessary information in real time via a communication line such as a CAN (Controller Area Network). The information may include outputs from sensors such as a vehicle-speed sensor, a yaw-rate sensor, and a steering-angle sensor, and information transmitted from ECUs such as a parking-assistance ECU.

The image-synthesizing device 100 receives the images captured by the cameras 10FR and 10RR in real time via the communication line. The images may be transmitted to the image-synthesizing device 100 in a stream format at an appropriate frame rate. The image-synthesizing device 100 generates the display image in each frame as shown in FIG. 3 by performing the processes that will be described below. Accordingly, the display image displayed on the display 20 is updated each time the frame is changed (that is, the display image on the display 20 is animated).

The overhead-image transformation portion 112 performs appropriate preprocessing such as the coordinate transformation so that the images captured by the cameras 10FR and 10RR are transformed into the overhead images, which are the images of the road surface viewed from the above (i.e., the bird's eye images). A coordinate transformation formula is appropriately set based on the known directions of the sight lines of the cameras 10FR and 10RR, and the known positions at which the cameras 10FR and 10RR are provided. The overhead images generated by the overhead-image transformation portion 112 are supplied to the image-synthesizing portion 120, and to the previous-image storage portion 116.

The previous-image storage portion 116 stores and retains the overhead images generated by the overhead-image transformation portion 112 as the previous images. Each previous image is provided with information concerning the time point when the previous image is captured (i.e., a time stamp). Then, each previous image is stored in the previous-image storage portion 116. Thus, the image-synthesizing portion 120 (described later) can determine the time point when each previous image stored in the previous-image storage portion 116 is captured. The previous-image storage portion 116 may retain only the previous images captured after a predetermined time point prior to the current time point according to the FIFO (First-In, First-Out) method, to effectively use the memory capacity.

The vehicle-image storage portion 115 stores the vehicle image to be disposed in the substantially center image region of the display image as shown in FIG. 3. The vehicle image schematically represents the overhead view of the vehicle, as shown in FIG. 3.

The image-synthesizing portion 120 synthesizes the display image by combining the latest overhead images (current images) that are captured during the current frame cycle, and the previous image that is captured during the last frame cycle or before the last frame cycle, and stored in the previous-image storage portion 116.

The current images are depicted at fixed positions that are appropriately determined based on the known directions of the sight lines of the cameras 10FR and 10RR, the known positions at which the cameras 10FR and 10RR are provided, and the like. The position at which the previous image is depicted needs to be changed according to the movement of the vehicle. Therefore, the position at which the previous image is depicted is appropriately determined based on the manner in which the vehicle moves from the time point when the previous image is captured to the current time point.

For example, the image-synthesizing portion 120 determines a movement distance $\beta$ from the location at which the previous image is captured to the current position of the vehicle, based on signals from the vehicle-speed sensor. In addition, the image-synthesizing portion 120 calculates the amount of change in the direction of the vehicle in the period from the time point when the previous image is captured to the current time point (hereinafter, this amount of change will be referred to as "deflection angle $\alpha$"), based on the signals from the steering-angle sensor and the vehicle-speed sensor. When the deflection angle $\alpha$ is a positive value, the deflection angle $\alpha$ indicates that the vehicle turns in a clockwise direction. When the deflection angle $\alpha$ is a negative value, the deflection angle $\alpha$ indicates that the vehicle turns in a counterclockwise direction. The deflection angle $\alpha$ is generally calculated according to the equation (1) described below. In the equation (1), "ds" represents a small distance that the vehicle moves, and "$\gamma$" represents a turning curvature (that is equivalent to the inverse of the turning radius of the vehicle). The equation (1) is used to calculate the deflection angle $\alpha$ that is the amount of change in the direction of the vehicle when the vehicle moves the distance of $\beta$ m.

$$\alpha = \sum_{i=1}^{k} \alpha_i, \; \alpha_i = \int_{-0.5}^{0} \gamma \cdot ds \qquad (2)$$

By modifying the equation (1), the equation (2) is obtained. The image-synthesizing portion 120 calculates a small deflection angle $\alpha_i$ each time the vehicle moves a predetermined distance (0.5 m in this embodiment). In addition, the image-synthesizing portion 120 calculates the deflection angle $\alpha$ by summing the small deflection angles $\alpha_1$ to $\alpha_k$, according to the equation (2).

$$\alpha = \int_{-\beta}^{0} \gamma \cdot ds \qquad (1)$$

Whether the vehicle moves the predetermined distance (0.5 m in this embodiment) is monitored by time-integrating the signals output from the vehicle-speed sensor (i.e., wheel-speed pulses). The turning curvature $\gamma$ is determined based on a steering angle Ha obtained from the steering-angle sensor. For example, the turning curvature $\gamma$ is calculated according to the equation, $\gamma = Ha/L \times \eta$. In this equation, L represents the length of a wheelbase, and $\eta$ represents the overall gear ratio of the vehicle (i.e., the ratio of the steering angle Ha to the turning angle of the wheel). The small deflection angle $\alpha_i$ may be calculated by multiplying the turning curvature $\gamma$ obtained each time the vehicle moves a small distance of 0.01 m by the small distance of 0.01 m, and then integrating the resultant values obtained by multiplication while the vehicle moves the distance of 0.5 m. A map indicating the relation between the turning curvature $\gamma$ and the steering angle Ha may be made based on data on the relation that is obtained in advance in each vehicle, and the map may be stored in the memory that can be accessed by the image-synthesizing device 100.

In this case, the image-synthesizing portion 120 determines the position at which the previous image is depicted, with respect to the positions at which the current images are depicted, based on the movement distance $\beta$ determined in the above-described manner. In addition, the image-synthesizing portion 120 determines the direction in which the previous image is oriented (i.e., the angle by which the previous image is rotated), based on the deflection angle $\alpha$ that is determined in the above-described manner. The methods for determining the position at which the previous image is depicted and the direction in which the previous image is oriented are not limited to the above-described methods. The position at which the previous image is depicted and the direction in which the previous image is oriented may be determined based on the position or the direction of a feature point extracted based on the result of image recognition. Alternatively, the position at which the previous image is depicted and the direction in which the previous image is oriented may be determined using another sensor (such as the yaw-rate sensor), or the like.

Next, with reference to FIGS. 4 to 8, the manner in which the image-synthesizing portion 120 according to the embodiment generates the display image will be described. Hereinafter, the manner in which the image-synthesizing portion 120 generates the display image for providing rear view assistance at the time of parking assistance will be described as an example.

Figure 5:
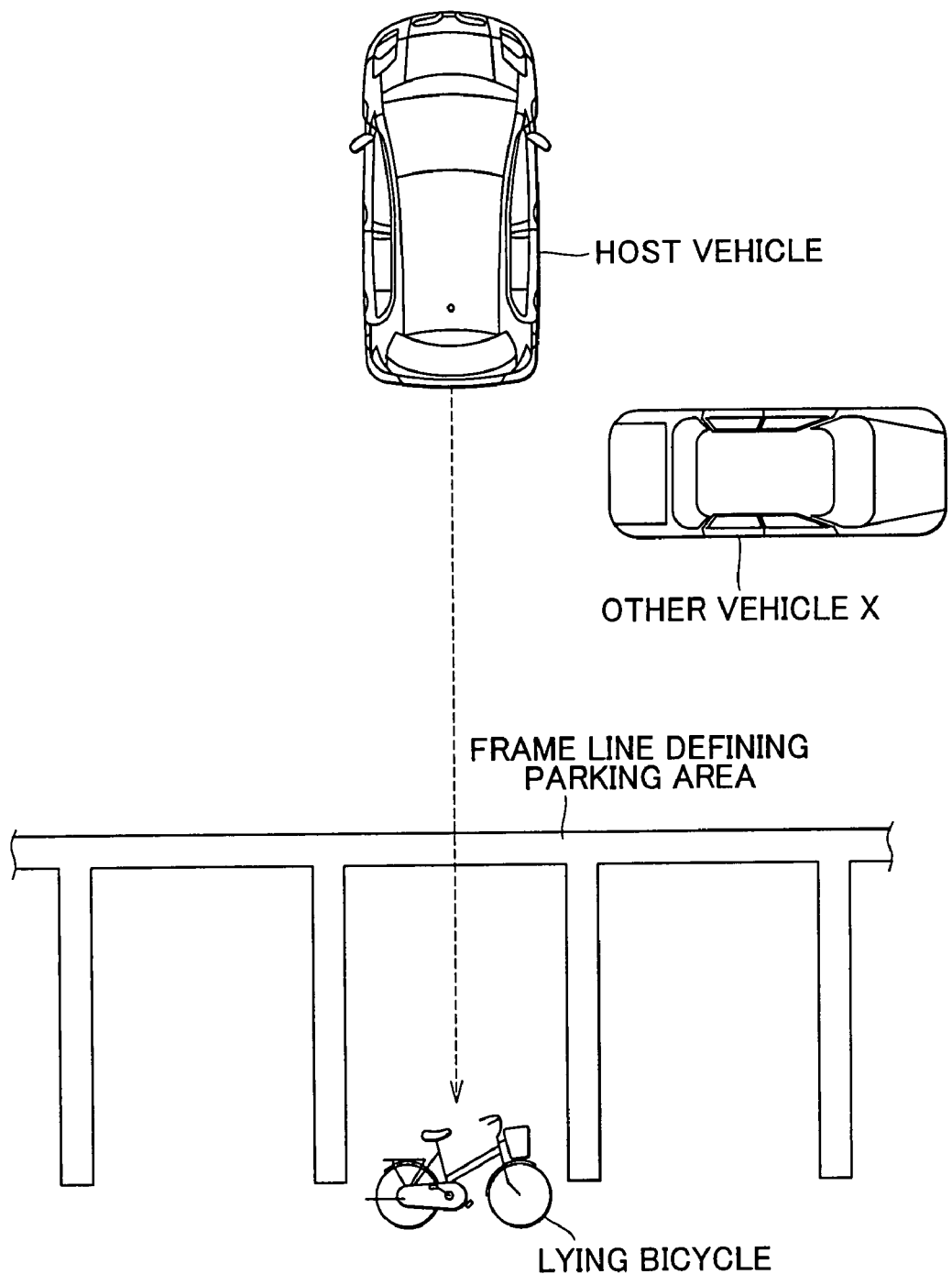
FIG. 5 is a plan view schematically showing an example of an environment surrounding a vehicle according to the first embodiment.

FIG. 5 is a plan view that schematically shows an example of an area surrounding the vehicle that is at a position at which the vehicle starts backing up for parking (hereinafter, this position will be referred to as "parking start position"). FIG. 5 shows the situation where the vehicle (host vehicle) provided with the vehicle surrounding monitoring system 70 according to the embodiment starts backing up into a parking area defined by a frame line. Another vehicle X is present on the right side behind the vehicle. A bicycle is lying in the parking area. The vehicle backs up from the position shown in FIG. 5 according to a dot line in FIG. 5.

Figure 6:
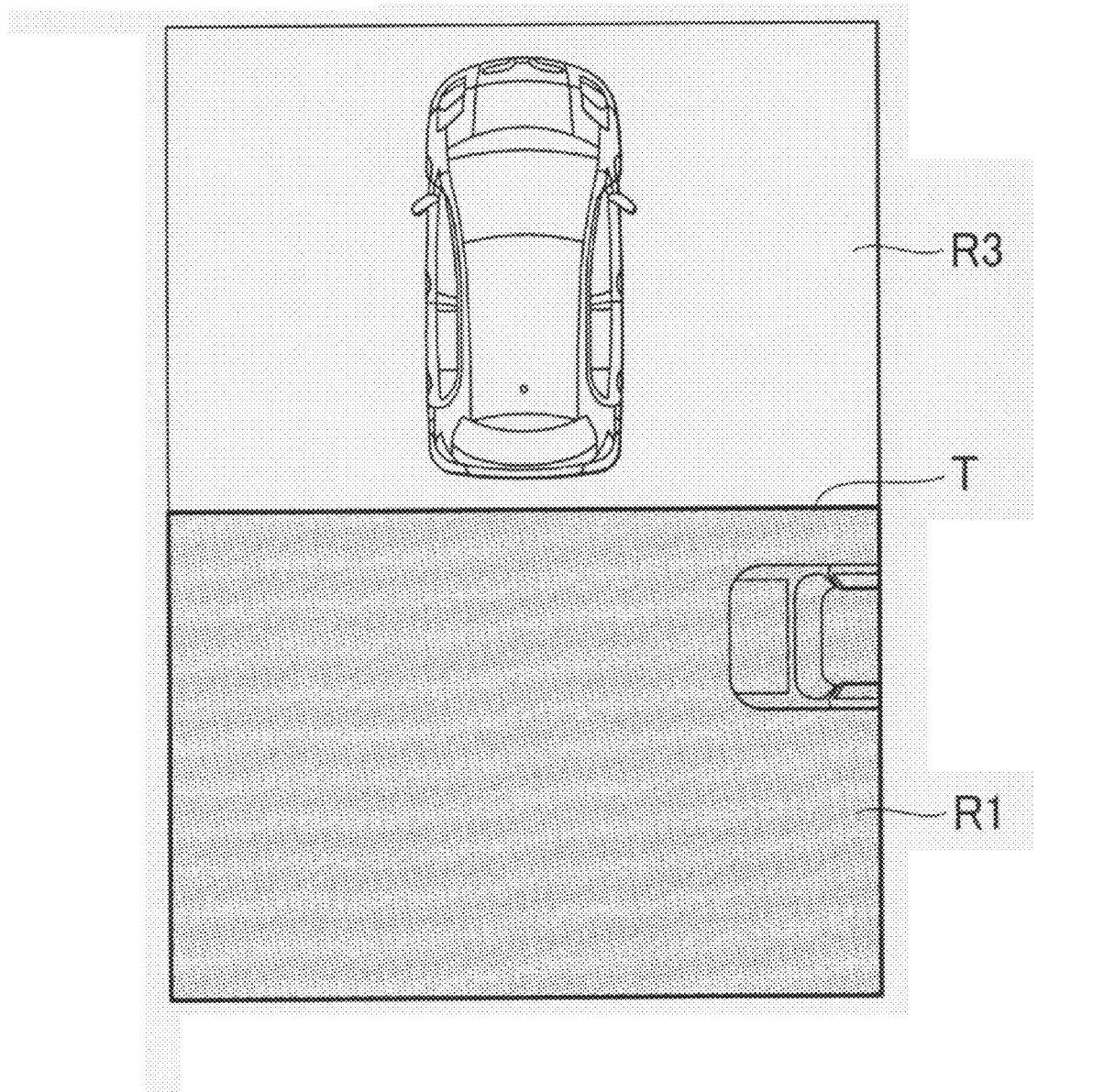
FIG. 6 is a diagram schematically showing an image generated at a parking start time point according to the first embodiment.

FIG. 6 schematically shows the display image (synthesized image) generated at the time point shown in FIG. 5, i.e., the time point when the vehicle starts backing up for parking (hereinafter, referred to as "parking start time point"). In this example, the image-synthesizing device 100 generates the display image using the images (the current image and the previous image) captured by the rear camera 10RR for providing rear view assistance. Accordingly, the image region that shows the rear area in the display image in FIG. 6 is larger than that in the display image in FIG. 3.

As shown in FIG. 6, a border line T may be depicted in the display image. The border line T defines an image region R1 where the current image is depicted. Thus, a user can easily recognize that the image region defined by the border line T relates to the current image in the display image, and accordingly, the image in the image region defined by the border line T is the real-time image.

Because the other vehicle X is present in the field of view of the rear camera 10RR at the parking start time point shown in FIG. 5, the image of the other vehicle X is depicted in the image region R1 at a position on the right side behind the vehicle image in the display image, based on the current image. Although the schematic image of the other vehicle X is depicted in FIG. 5, the actual image of the other vehicle X is realistic (the actual image of the bicycle (described later) is also realistic). Thus, the user can easily recognize that the other vehicle X is present on the right side behind the vehicle.

In the example shown in FIG. 6, for example, the entire image region R3 on the sides of the vehicle image is white, that is, the image region R3 is like a region that becomes white due to overexposure. In other words, no image is substantially depicted in the image region R3. This signifies that the image of the area on the sides of the vehicle is not captured when the vehicle moves forward to the parking start position (that is, there is no previous image of the area on the sides of the vehicle) as shown in FIG. 5. However, if the image of the area on the sides of the vehicle is captured by the front camera 10FR when the vehicle moves forward to the parking start position, the image may be depicted in the image region R3 on the sides of the vehicle image, using the previous image captured by the front camera 10FR, according to a method similar to the method for depicting the previous image, which will be described below.

Figure 7:
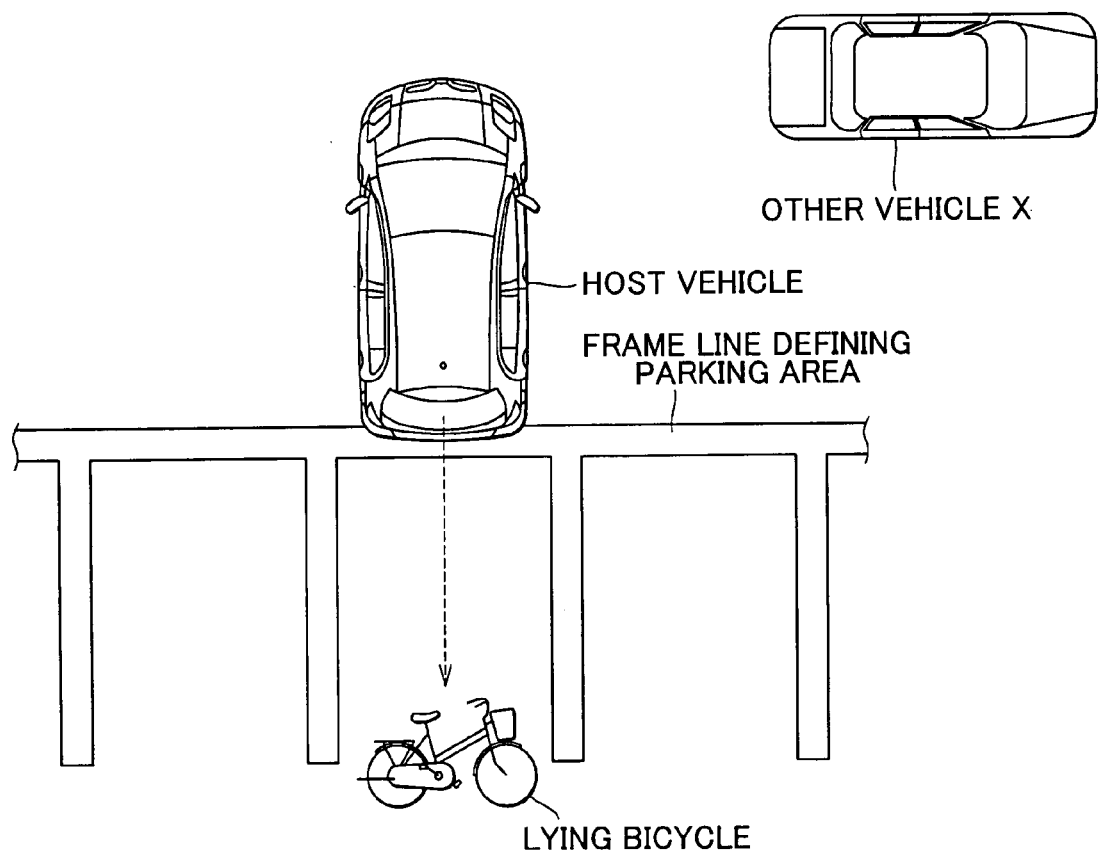
FIG. 7 is a plan view schematically showing an example of an environment surrounding the vehicle that is at a parking process position according to the first embodiment.

FIG. 7 is a plan view that schematically shows an example of the area surrounding the vehicle that is at a certain position while the vehicle is backing up (hereinafter, this position will be referred to as "parking process position"). As shown in FIG. 7, the other vehicle X, which was present on the right side behind the vehicle when the vehicle started backing up (refer to FIG. 5), has moved to the outside of the field of view of the rear camera 10RR, and then has moved rightward.

Figure 8:
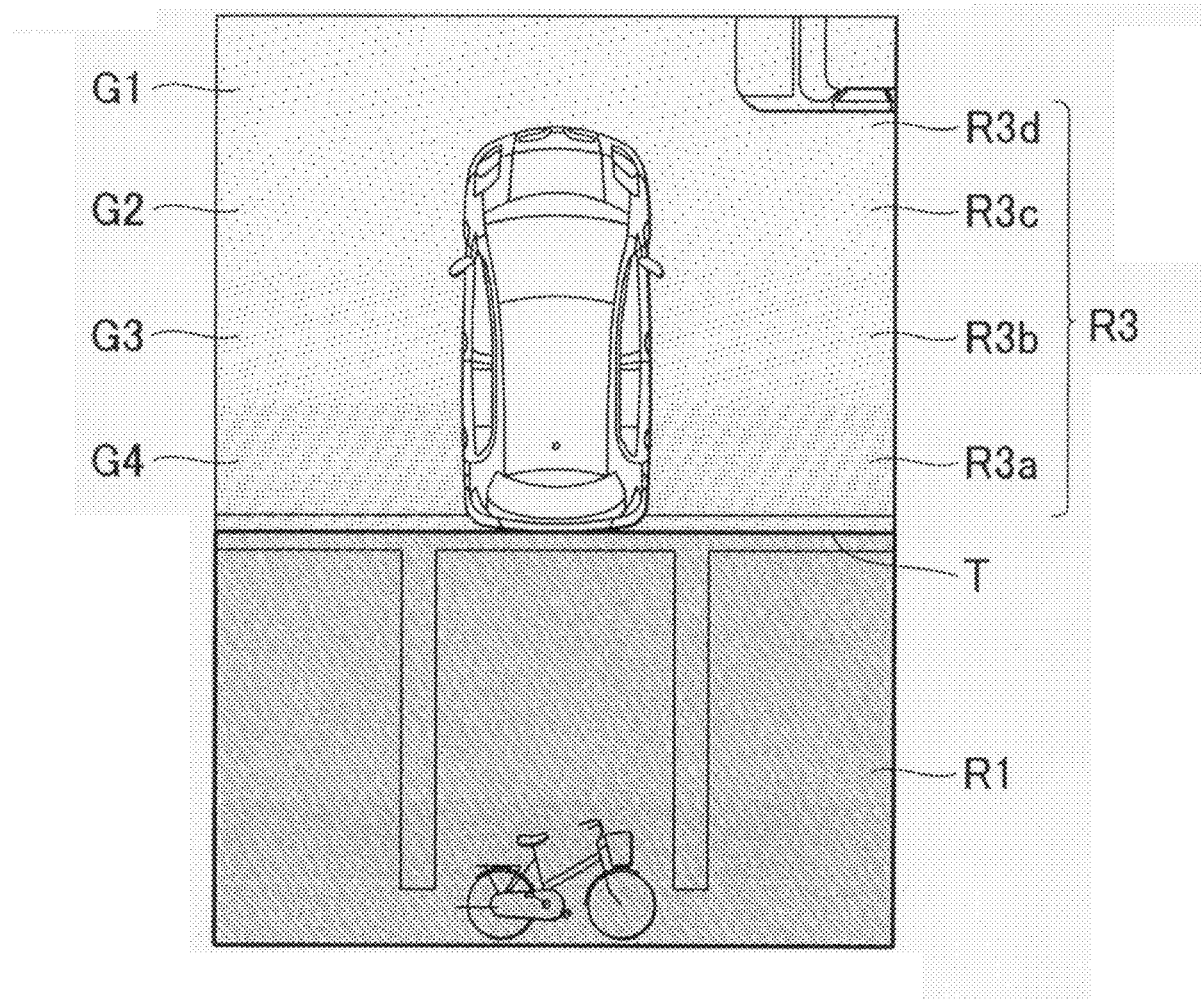
FIG. 8 is a diagram schematically showing a display image (synthesized image) generated at a parking process time point according to the first embodiment.

FIG. 8 schematically shows the display image (synthesized image) generated at a certain time point while the vehicle is backing up (hereinafter, this time point will be referred to as "parking process time point"). At the parking process time point shown in FIG. 7, the lying bicycle is in the field of view of the rear camera 10RR. Therefore, the image of the lying bicycle is depicted in the image region R1 at a position behind the vehicle image in the display image, based on the current image. Thus, the user can easily recognize that the bicycle is now lying behind the vehicle. The image of the area on the sides of the vehicle is depicted in the image region R3 on the sides of the vehicle image in the display image, based on at least one previous image that is captured by the rear camera 10RR during the period from the parking start time point to the parking process time point, and stored in the previous-image storage portion 116. When the image-synthesizing portion 120 depicts the image in the image region R3 using a plurality of previous images, the plurality of previous images may partially overlap with each other. In this case, the latest image among the plurality of previous images is depicted in the foreground, and the other previous images are appropriately trimmed. That is, the latest image among the plurality of previous images is overlaid on the other previous images. Thus, a seamless image is depicted in the image region R3 using the plurality of previous images.

In the example shown in FIG. 8, the images in the image regions R3 on the sides of the vehicle image is depicted using four previous images captured at different time points. In FIG. 8, an image G1 depicted using the previous image captured at time point t1 is displayed in the image region R3$d$, an image G2 depicted using the previous image captured at time point t2 is displayed in the image region R3$c$, an image G3 depicted using the previous image captured at time point t3 is displayed in the image region R3$b$, and an image G4 depicted using the previous image captured at time point t4 is displayed in the image region R3$a$. In this example, the parking start time point is t0, and the parking process time point (current time point) shown in FIG. 7 is time point t5. The relation among the time points is represented by the equation, $t0<t1<t2<t3<t4<t5$.

FIG. 8 schematically shows the contrast ratio of the display image using the color of hatching. As shown in FIG. 8, the image-synthesizing portion 120 makes the contrast ratios of the images G1 to G4 different according to the time points at which the previous images used to depict the images G1 to G4 in the image regions are captured. The contrast ratio may be corrected, for example, by correcting a contrast ratio filter or a tone curve.

More specifically, the image-synthesizing portion 120 depicts the image G1 using the latest previous image in the image region R3$a$ with the highest contrast ratio L4, as shown in FIG. 8. The contrast ratio L4 of the image G4 is lower than the contrast ratio (i.e., standard contrast ratio) of the image region R1 where the image is depicted based on the current image. The image-synthesizing portion 120 depicts the images G3 to G1 using the previous images in the image regions R3$b$, R3$c$, and R3$d$, respectively such that as the previous image is older, the contrast ratio is gradually decreased from L3 to L1. Accordingly, the image-synthesizing portion 120 depicts the image G1 using the oldest previous image in the image region R3$d$ with the lowest contrast ratio L1. Thus, the display image is generated such that the contrast ratio is decreased in a stepwise manner from the contrast ratio L4 of the image G4 to the contrast ratio L1 of the image G1.

The reliability of the image region where the image is depicted using the previous image decreases over time. Therefore, the reliability of the image region where the image is depicted using the previous image captured a long time ago may significantly differ from the reliability of the image region where the image is depicted using the previous image that has just been captured. Accordingly, it is not desirable that the previous images that are captured at different time points be displayed in a uniform manner, because the user cannot determine the reliability.

However, according to the embodiment, when the display image is synthesized by combining the previous images with the current image, the contrast ratio of each image region is changed according to the elapsed time after each previous image is captured, as described above. Therefore, the user can easily determine the reliability of the information provided by each previous image. Also, according to the embodiment, as the elapsed time after the previous image is captured increases, the contrast ratio is decreased, that is, the level of visibility is decreased. Thus, each previous image can be displayed according to the degree of decrease in the reliability. For example, in the example shown in FIG. 8, the image G1 of the other vehicle X that is not actually present is depicted in the image region R3d. However, because the contrast ratio L1 of the image G1 is lowest and the level of visibility of the image G1 is lowest, the user sees the blurred image of the other vehicle X. Therefore, the user can perceive that the reliability of the image of the other vehicle X is low. The contrast ratio L4 of the image G4 depicted in the image region R3a using the latest previous image is highest among the contrast ratios of the images G1 to G4 depicted in the image regions using the previous images. Therefore, the user can visually recognize an object that may be depicted in the image G4 relatively easily. In this example, when the user sees the image G4, the user can visually and easily recognize the positional relation between the horizontal line that defines the parking area and the rear portion of the vehicle.

Also, in this embodiment, the contrast ratio of the image region where a certain previous image is depicted in each of the display images in a plurality of frames is decreased according to the elapsed time after the certain previous image is captured. Therefore, the display images in the plurality of frames can be generated in the manner similar to the manner in which the human memory fades away over time. For example, the vehicle may back up at a constant speed without stopping. In this case, the previous image showing the other vehicle X, which is used to depict the image G1 in the image region, is depicted as follows. At time point t1, the image is depicted as the current image in the image region R1 with the standard contrast ratio. At time point t2, the previous image is depicted in the image region R3a with the contrast ratio L4 that is lower than the standard contrast ratio (refer to FIG. 8). At time point t3, the previous image is depicted in the image region R3b with the contrast ratio L3 that is lower than the contrast ratio L4. At time point t4, the previous image is depicted in the image region R3c with the contrast ratio L2 that is lower than the contrast ratio L3. At time point t5, the previous image is depicted in the image region R3d (=image G1 in FIG. 8) with the contrast ratio L1 that is lower than the contrast ratio L2. That is, the contrast ratio of the image region where the previous image is depicted in each of the display images is gradually decreased from time point t1 to time point t5. Thus, the contrast ratio of the image of the other vehicle X can be decreased in the manner similar to the manner in which the user's memory about the other vehicle X fades away over time.

In this embodiment, if the vehicle is temporarily stopped at the parking process time point, the image with the standard contrast ratio is maintained in the image region R1 based on the current image that is constantly supplied. The contrast ratios of the image regions R3 relating to the previous image are gradually decreased over time. For example, the contrast ratio of the image region R3a (the contrast ratio L4 at time point t5) is gradually decreased from the contrast ratio L4 to the contrast ratio L1 over time while the vehicle is stopped. If the time further elapses, the contrast ratio of the image region R3a may be maintained at the contrast ratio L1. Alternatively, the contrast ratio of the image region R3a may be decreased to zero. In this case, the image regions R3 where the images are depicted using the previous image are like regions that become white due to overexposure, as shown in FIG. 6.

In the example described with reference to FIG. 8, the four previous images captured at different time points are used. However, the number of the previous images that are used is appropriately determined according to the manner in which the vehicle moves, the frame cycle, and the like. The display image may be generated using one previous image and the current image, or using five or more previous images and the current image.

ii. Second Embodiment

The second embodiment differs from the first embodiment mainly in the manner in which the cameras are provided, and the manner in which the previous images are used. In the following description, the portions with same configurations as in the first embodiment are denoted by the same reference numerals, and description thereof will be omitted.

Figure 9:
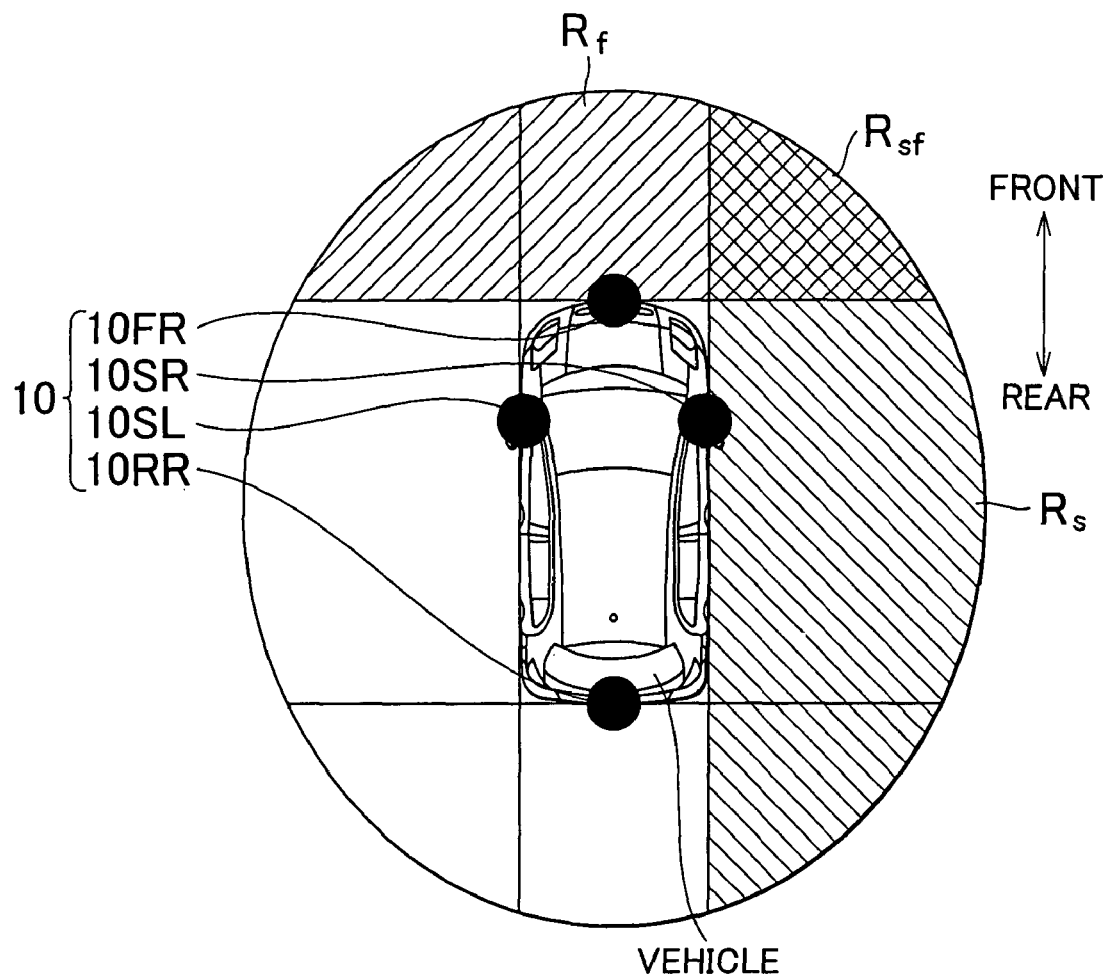
FIG. 9 is a plan view showing an example of a manner in which cameras are provided, and an example of areas whose images are captured by the cameras according to a second embodiment of the invention.

FIG. 9 is a plan view that shows an example of the manner in which the cameras 10 are provided and an example of areas whose images captured by the cameras 10. As shown in FIG. 9, four cameras 10FR, 10SL, 10SR, and 10RR are provided in the front portion, the side portions and the rear portion of the vehicle, respectively. Each of the cameras 10FR, 10SL, 10SR, and 10RR may be a wide-angle camera that includes a fisheye lens, as in the first embodiment.

As schematically shown in FIG. 9, the left camera 10SL is provided in a left side mirror to capture the image of the surrounding area that includes a road surface on the left side of the vehicle. As schematically shown in FIG. 9, the right camera 10SR is provided in a right side mirror to capture the image of the surrounding area that includes a road surface on the right side of the vehicle.

FIG. 9 schematically shows an example of areas whose images are captured by the cameras 10. In the example shown in FIG. 9, each camera 10 is a wide-angle camera. The area whose image is captured by each camera 10 is shown in a sector shape. In FIG. 9, an imaged area Rf whose image is captured by the front camera 10 FR, and an imaged area Rs whose image is captured by the right camera 10SR are emphasized by hatching. As shown in FIG. 9, each imaged area may include at least one area that overlaps with the other imaged area (for example, an area Rsf in FIG. 9). Thus, in the example shown in FIG. 9, the four cameras 10FR, 10SL, 10SR, and 10RR capture the images of the scenery all around the vehicle, in cooperation with each other. Accordingly, the occupant can determine the condition of the road surface and the condition of objects on the road (for example, compartment lines on the road, and the positions of obstacles) in all directions around the vehicle. The final display image of the area where the imaged areas overlap with each other (for example, the area Rsf in FIG. 9) may be generated by using selected one of the images of the imaged areas, or by using both of the images of the imaged areas in a cooperative manner.

Figure 10:
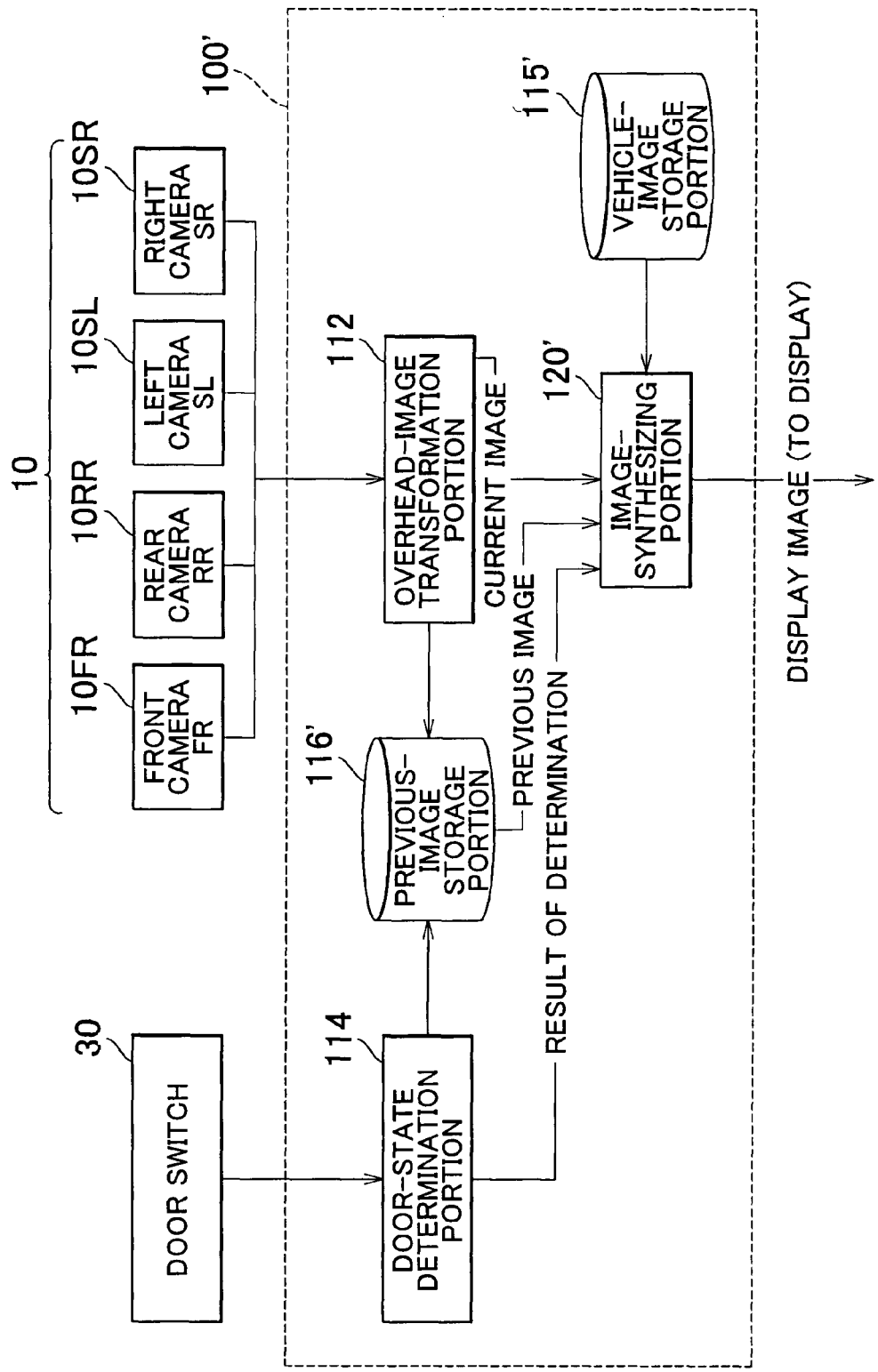
FIG. 10 is a function block diagram showing the main functions of an image-synthesizing device according to the second embodiment.

FIG. 10 is a function block diagram showing the main functions of the image-synthesizing device 100' according to the second embodiment. The hardware configuration of the image-synthesizing device 100' mainly includes a microcomputer. That is, the image-synthesizing device 100' includes a CPU, memories (for example, ROM, RAM and EEPROM), a timer, a counter, an input/output interface, and the like. The CPU executes processes according to predetermined execution programs. The memories store the execution programs executed by the CPU, image data, the results of calculations, and the like. The CPU, the memories, and the input/output interface are connected to each other by a data bus. Portions of the image-synthesizing device 100', which will be hereinafter described, are realized by the memories that can be accessed by the CPU, and the programs that are executed by the CPU.

The image-synthesizing device 100' according to the embodiment includes the overhead-image transformation portion 112, a door-state determination portion 114, a vehicle-image storage portion 115', a previous-image storage portion 116', and an image-synthesizing portion 120'. The previous-image storage portion 116' is regarded as "the storage portion", and the image-synthesizing portion 120' is regarded as "the display-image generation portion" according to the invention.

The image-synthesizing device 100' receives necessary information in real time via a communication line such as a CAN (Controller Area Network). The information may include vehicle speed information obtained by the vehicle-speed sensor, and information necessary for a door-state determination process that will be described later (for example, on/off signals from a door switch 30). The image-synthesizing device 100' receives the images captured by the cameras 10FR, 10SL, 10SR, and 10RR in real time via the communication line. The images may be transmitted to the image-synthesizing device 100' in the stream format at an appropriate frame rate. The image-synthesizing device 100' generates the display image in each frame by performing the processes that will be described below. Accordingly, the display image displayed on the display 20 is updated each time the frame is changed (that is, the display image on the display 20 is animated).

The door-state determination portion 114 determines whether the doors provided with the right and left cameras 10SR and 10SL are in an opened state or a closed state. More specifically, the door-state determination portion 114 determines at least whether the front-left door provided with the left camera 10SL is in the opened state or the closed state, and whether the front-right door provided with the right camera 10SR is in the opened state or the closed state. The door-state determination portion 114 may determine whether each of all the doors that may be opened/closed is in the opened state or the closed state.

For example, the door-state determination portion 114 may determine whether each door is in the opened state or the closed state, based on an output from the door switch 30 that is ordinarily provided in the door (i.e., a switch for warning, which outputs the ON signal when the door is opened).

Alternatively, the door-state determination portion 114 may determine whether the doors are in the opened state or closed state, based on the images captured by the right and left cameras 10SR and 10SL, because the sight lines (optical axes) of the right and left cameras 10SR and 10SL change according to the opened/closed states of the doors, and thus the positions or the directions of objects change in the images captured by the right and left cameras 10SR and 10SL according to the opened/closed state of the doors. For example, the door-state determination portion 114 performs edge processing or the like for the images captured by the right and left cameras 10SR and 10SL, thereby extracting a feature point relating to a specific object (for example, a feature point relating to a compartment line on the road). Then, the door-state determination portion 114 monitors the manner in which the position or the direction of the feature point relating to the specific object changes when the frame is changed. When the position or the direction of the feature point relating to the specific object has changed even though the position of the vehicle has not changed, the door-state determination portion 114 determines that the door is opened or closed.

The vehicle-image storage portion 115' stores the vehicle image that is disposed in the substantially center region of the display image. A plurality of vehicle images showing different combinations of the opened/closed states of the doors may be prepared. That is, the vehicle image showing that all the doors are in the closed state, the vehicle image showing that the front left door is in the opened state, the vehicle image showing that the front right door is in the opened state, the vehicle image showing that the front left and front right doors are in the opened state, and the like may be prepared and stored, for example, in the template form.

The previous-image storage portion 116' stores and retains the side images captured by the right and left cameras 10SR and 10SL when the door-state determination portion 114 determines that the doors are in the closed state based on the result of determination. The previous-image storage portion 116' does not need to store all the side images that are constantly supplied over time as described above. The previous-image storage portion 116' may store and retain only the latest side images captured by the right and left cameras 10SR and 10SL when the doors are in the closed state. That is, when the door-state determination portion 114 determines that the doors are in the closed state in the current frame cycle, the side images that are previously stored (i.e., the side images captured in the last frame cycle or before the last frame cycle) are erased, and the side images captured in the current frame cycle may be stored and retained. For example, when the door-state determination portion 114 determines that the front right door is opened, the previous-image storage portion 116' does not store or retain the image captured by the right camera 10SR thereafter, although the image captured by the right camera 10SR may be temporarily stored in the other storage region. The side images stored in the previous-image storage portion 116 in the above-described manner are used by the image-synthesizing portion 120', as described later. The overhead-image transformation portion 112 performs appropriate preprocessing for the images captured by the right and left cameras 10SR and 10SL to transform the captured images into the overhead images of the road surface on the sides of the vehicle, which are the images viewed from the above. Then, the previous-image storage portion 116' stores the overhead images.

When the door-state determination portion 114 determines that the doors are in the closed state, the image-synthesizing portion 120' generates and updates the display image based on the images that are captured by the cameras 10FR, 10SL, 10SR, and 10RR, and constantly supplied each time the frame is changed. More specifically, the image-synthesizing portion 120' reads out "the vehicle image showing that all the doors are in the closed state" that are stored in the vehicle-image storage portion 115'. Then, the image-synthesizing portion 120' depicts the vehicle image in the center image region of the display image. Also, the image-synthesizing portion 120' depicts the images captured by the cameras 10FR, 10SL, 10SR, and 10RR in appropriate image regions around the vehicle image in the display image. Thus, the display image is generated. The positions (regions) where the images captured by the cameras 10FR, 10SL, 10SR, and 10RR are depicted are determined in advance, based on the imaged areas whose images are captured by the cameras 10FR, 10SL, 10SR, and 10RR when the doors are in the closed state (refer to FIG. 9). The display image that is generated in the above-described manner is displayed on the display 20.

When the door-state determination portion 114 determines that at least one of the front right and front left doors is in the opened state, the image-synthesizing portion 120' synthesizes the display image by combining the latest overhead images that are captured in the current frame cycle (i.e., the current images) and at least one previous image that is captured in the last frame cycle or before the last frame cycle, and stored in the previous-image storage portion 116'.

Figure 11:
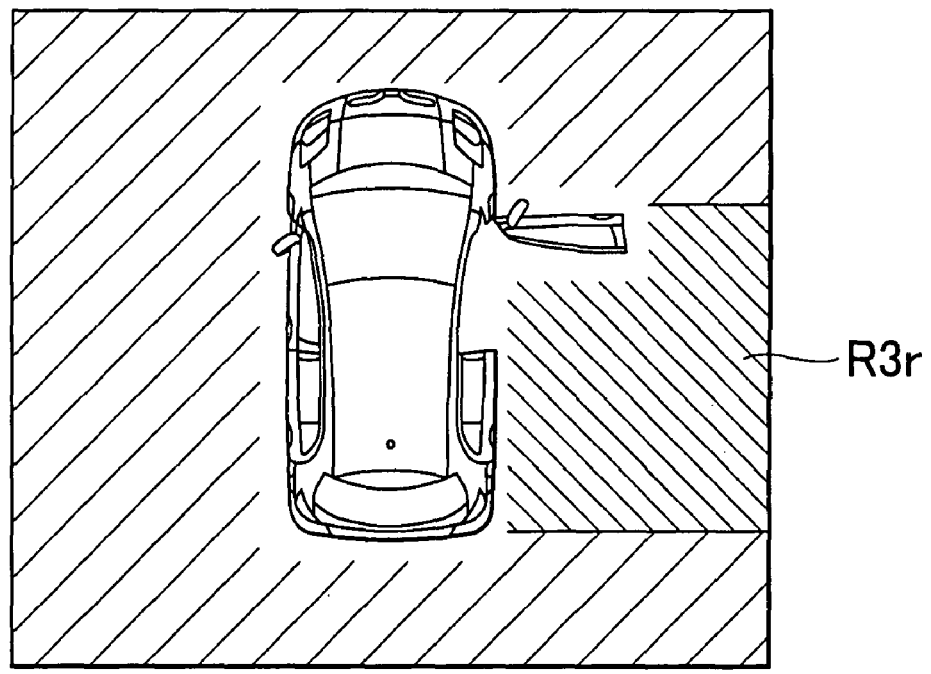
FIG. 11 is a diagram schematically showing a display image generated at a time point when it is determined that a door is in an opened state according to the second embodiment.

FIG. 11 schematically shows the display image that is generated at the time point when it is determined that the at least one of the front right and front left doors is in the opened state. FIG. 11 shows the display image that is generated when the front right door is in the opened state, as an example.

When the front right door provided with the right camera 10SR is opened as in this example, the direction of the sight line of the right camera 10SR is changed. Therefore, the image of the area behind the front right door cannot be captured thereafter, until the front right door is closed. That is, the area behind the front right door becomes "a dead area". Accordingly, when the front right door is in the opened state as shown in FIG. 11, an appropriate image cannot be depicted in an image region R3r on the right side of the vehicle image in the display image, if only the current image captured by the right camera 10SR is used.

However, in this embodiment, the previous image of the area behind the front right door is used. That is, when the door-state determination portion 114 determines that the front right door is in the opened state, the image-synthesizing portion 120' reads out "the vehicle image showing that the front right door is in the opened state" that is stored in the vehicle-image storage portion 115'. Then, the image-synthesizing portion 120' depicts the vehicle image in the center image region of the display image. Also, the image-synthesizing portion 120' depicts the images captured by the cameras 10FR, 10SL, and 10RR in the front, left, and rear image regions, respectively in the display image. Further, the image-synthesizing portion 120' depicts the previous image in the image region on the right side of the vehicle image in the display image. Thus, the display image is generated. The previous image is the latest image that is captured when the front right door is in the closed state as described above (i.e., the image that is captured immediately before the front right door is opened). Therefore, it is unlikely that the situation in the area behind the front right door (dead area) greatly changes during the period from the time point when the previous image is captured until the current time point (i.e., the time point when the door is opened). Accordingly, because the display image is complemented by the previous image of the dead area, the display image can provide highly reliable information to the user while supplying the image of the dead area that cannot be captured by the right camera 10SR.

The image-synthesizing portion 120' in the second embodiment decreases the contrast ratio of the previous image according to the elapsed time after the door is opened, as in the first embodiment. That is, the contrast ratio of the image region, where the previous image is initially depicted at the time point when it is determined that the door is opened, is set to a high value (for example, the contrast ratio L4 in the first embodiment). Then, while the door is kept open, the contrast ratio of the image region, where the previous image is depicted, is gradually decreased according to the elapsed time. This is because the reliability of the information provided by the previous image decreases over time, as described above. Thus, the previous image can be displayed according to the decrease in the reliability. Also, the contrast ratio of the image region where a certain previous image is depicted in each of the display images in a plurality of frames is gradually decreased according to the elapsed time after the certain previous image is captured. Therefore, the display images in the plurality of frames can be generated in the manner similar to the manner in which the human memory gradually fades away over time.

In this embodiment, for example, when the door that is not provided with the camera 10 (for example, the rear door) is opened, and the opened rear door interrupts the field of view of the camera 10 such that a dead area is generated, the previous image of the dead area may be used. In this case as well, the image-synthesizing portion 120' decreases the contrast ratio of the previous image according to the elapsed time after the door is opened.

Although the example embodiments of the invention have been described in detail, the invention is not limited to the above-described embodiments. Various modifications and replacements may be made without departing from the spirit of the invention.

For example, in each of the above-described embodiments, the image-synthesizing portion 120 (120') corrects the contrast ratio or the level of sharpness, thereby decreasing the level of visibility of the image region relating to the previous image according to the elapsed time. However, instead of, or in addition to correcting the contrast ratio or the level of sharpness, for example, the image-synthesizing portion 120 (120') may increase or decrease the brightness or luminance of the previous image by gamma correction, thereby decreasing the level of visibility of the image region relating to the previous image according to the elapsed time. For example, the image-synthesizing portion 120 (120') may correct the contrast ratio and the brightness, thereby decreasing the level of visibility according to the elapsed time until the image region becomes white (or black). Also, other parameters such as hue and color may be used as long as the level of visibility can be changed by changing the parameters.

What is claimed is:

1. A vehicle surrounding monitoring system comprising:
    an image-capturing portion that captures an image of at least a portion of an area surrounding a vehicle;
    a storage portion that stores the image captured by the image-capturing portion;
    a display-image generation portion that generates a synthesized image for display using a latest image that is captured by the image-capturing portion, and a previous image that is captured before the latest image is captured; and
    a display portion on which the synthesized image is displayed, wherein the display-image generation portion decreases a level of visibility of an image region relating to the previous image while an elapsed time after the previous image is captured increases, and
    wherein the display-image generation portion is configured to determine the level of visibility of the image region relating to the previous image based on an amount of elapsed time after the previous image is captured.

2. The vehicle surrounding monitoring system according to claim 1, wherein the display-image generation portion generates the synthesized image using a plurality of previous images that are captured at different time points.

3. The vehicle surrounding monitoring system according to claim 1, wherein when the display-image generation portion generates the synthesized images in a plurality of frames using a certain previous image, the display-image generation portion gradually decreases a level of visibility of an image region relating to the certain previous image in each of the synthesized images in the plurality of frames, according to an elapsed time after the certain previous image is captured.

4. The vehicle surrounding monitoring system according to claim 1, wherein the display-image generation portion decreases the level of visibility of the image region relating to the previous image, by correcting at least one of a contrast ratio and a luminance.

5. The vehicle surrounding monitoring system according to claim 1, further comprising
a vehicle-image storage portion that stores a vehicle image in advance, wherein the vehicle image stored in the vehicle-image storage portion is disposed in the synthesized image, and displayed on the display portion.

6. The vehicle surrounding monitoring system according to claim 1, further comprising
an overhead-image transformation portion that transforms the image captured by the image-capturing portion into an overhead image by performing preprocessing, wherein the storage portion stores the overhead image into which the image is transformed by the overhead-image transformation portion by performing the preprocessing.

7. The vehicle surrounding monitoring system according to claim 6, wherein the preprocessing performed by the overhead-image transformation portion includes at least one of coordinate transformation, distortion correction, and perspective correction.

8. The vehicle surrounding monitoring system according to claim 1, wherein when an image of a certain portion of the area surrounding the vehicle is not included in an image region relating to the latest image, the previous image of the certain portion is used.

9. The vehicle surrounding monitoring system according to claim 1, wherein:
the image-capturing portion is provided in plurality; and
when the images captured by the plurality of image-capturing portions partially overlap with each other, the plurality of image-capturing portions captures the images in cooperation with each other.

10. The vehicle surrounding monitoring system according to claim 1, further comprising
a door-state determination portion that determines an opened/closed state of at least one of doors of the vehicle, wherein:
the image-capturing portion is disposed in the at least one of the doors; and
the storage portion stores an image captured by the image-capturing portion disposed in the at least one of the doors, based on the opened/closed state of the at least one of the doors.

11. The vehicle surrounding monitoring system according to claim 10, wherein the door-state determination portion determines the opened/closed state of the at least one of the doors, by monitoring a manner in which the image captured by the image-capturing portion disposed in the at least one of the doors changes when a frame is changed.

12. The vehicle surrounding monitoring system according to claim 10, further comprising
a vehicle-image storage portion that stores in advance a plurality of vehicle images showing different opened/closed states of the at least one of the doors, wherein a vehicle image among the plurality of vehicle images is read out from the vehicle-image storage portion, according to a determination made by the door-state determination portion.

13. A vehicle surrounding monitoring method comprising:
capturing an image of at least a portion of an area surrounding a vehicle;
storing the image that is captured;
generating a synthesized image using a latest image that is captured, and a previous image that is captured before the latest image is captured;
displaying the synthesized image; and
decreasing a level of visibility of an image region relating to the previous image while an elapsed time after the previous image is captured increases,
wherein the level of visibility of the image region relating to the previous image is based on an amount of elapsed time after the previous image is captured.

14. The vehicle surrounding monitoring method according to claim 13, wherein the synthesized image is generated using a plurality of previous images that are captured at different time points.

15. The vehicle surrounding monitoring method according to claim 13, wherein when the synthesized images in a plurality of frames are generated using a certain previous image, a level of visibility of an image region relating to the certain previous image in each of the synthesized images in the plurality of frames is decreased according to the elapsed time after the certain previous image is captured.

16. The vehicle surrounding monitoring method according to claim 13, wherein the level of visibility of the image region relating to the previous image is decreased by correcting at least one of a contrast ratio and a luminance.

17. A vehicle surrounding monitoring system comprising:
image-capturing means for capturing an image of at least a portion of an area surrounding a vehicle;
storage means for storing the image captured by the image-capturing means;
display-image generation means for generating a synthesized image for display using a latest image that is captured by the image-capturing means, and a previous image that is captured before the latest image is captured; and
display means on which the synthesized image is displayed,
wherein the display-image generation means decreases a level of visibility of an image region relating to the previous image while an elapsed time after the previous image is captured increases, and
wherein the display-image generation means is configured to determine the level of visibility of the image region relating to the previous image based on an amount of elapsed time after the previous image is captured.

* * * * *